US012296423B2

(12) United States Patent
Stevens et al.

(10) Patent No.: US 12,296,423 B2
(45) Date of Patent: May 13, 2025

(54) SAFETY SYSTEM FOR MITER SAW AND METHOD OF USE THEREOF

(71) Applicant: Masonite Corporation, Tampa, FL (US)

(72) Inventors: James A. Stevens, Columbus, KS (US); Frank Wilhelm, Marshfield, WI (US); Kohl L. Knopp, Muncy, PA (US); Robert Woods, Westville, IN (US); Kurian A. Anthraper, Campbell, TX (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 18/612,595

(22) Filed: Mar. 21, 2024

(65) Prior Publication Data

US 2024/0227105 A1 Jul. 11, 2024

Related U.S. Application Data

(62) Division of application No. 17/724,004, filed on Apr. 19, 2022, now Pat. No. 11,958,152.

(60) Provisional application No. 63/176,474, filed on Apr. 19, 2021.

(51) Int. Cl.
B23Q 11/00 (2006.01)
B23Q 11/06 (2006.01)
B23Q 17/24 (2006.01)

(52) U.S. Cl.
CPC .......... B23Q 11/0082 (2013.01); B23Q 11/06 (2013.01); B23Q 17/2438 (2013.01)

(58) Field of Classification Search
CPC .. B23Q 11/0082; B23Q 11/06; B23Q 59/001; B23Q 17/2438; B23D 47/00; F16P 3/18
USPC ............................................. 83/62
See application file for complete search history.

(56) References Cited

U.S. PATENT DOCUMENTS

| 4,959,906 A | 10/1990 | Moore, Jr. |
| 5,148,053 A | 9/1992 | Dubois, III |
| 5,396,222 A * | 3/1995 | Kus ........................... F16P 3/18 341/20 |
| 5,560,290 A * | 10/1996 | Kaneko .................... B21D 5/02 192/131 H |

(Continued)

FOREIGN PATENT DOCUMENTS

| CA | 2616448 A1 | 7/2008 |
| DE | 102019103523 A1 | 8/2020 |
| GB | 896503 A | 5/1962 |

Primary Examiner — Nhat Chieu Q Do
(74) Attorney, Agent, or Firm — Ice Miller LLP

(57) ABSTRACT

A safety system for a power miter saw comprises a support member, at least one multidirectional manipulator including a workpiece holder member moveably mounted to the support member for securing a workpiece in place, and a control box. The workpiece holder member includes a presence indicator operatively connected to the control box and configured to detect the physical presence of a saw operator's hand on the at least one multidirectional manipulator when the saw operator's hand engages the presence indicator. The control box is operatively connectable to a trigger switch of the power miter saw so that an electric motor of the power miter saw is activated only when both the presence indicator of the safety system and the trigger switch of the power miter saw are engaged by both hands of an operator of the power miter saw.

12 Claims, 3 Drawing Sheets

(56) References Cited

U.S. PATENT DOCUMENTS

| | | |
|---|---|---|
| 5,778,747 A | 7/1998 | Chen |
| 6,148,504 A | 11/2000 | Schmidt et al. |
| 8,100,039 B2 | 1/2012 | Gass |
| 8,186,256 B2 | 5/2012 | Carrier |
| 8,408,107 B2 | 4/2013 | Carrier et al. |
| 8,430,005 B2 | 4/2013 | Gass et al. |
| 8,950,305 B1 | 2/2015 | Shiban |
| 9,038,515 B2 | 5/2015 | Gass |
| 9,446,533 B2 | 9/2016 | O'Banion et al. |
| 10,014,127 B2 | 7/2018 | Chiang |
| 11,221,104 B2 | 1/2022 | Rothenaicher |
| 2002/0170399 A1 | 11/2002 | Gass et al. |
| 2014/0130645 A1* | 5/2014 | Takano .................. F16P 3/147 83/13 |
| 2016/0221210 A1 | 8/2016 | Lin et al. |
| 2017/0110266 A1 | 4/2017 | Chiang |
| 2017/0370526 A1 | 12/2017 | Mahadevan |
| 2018/0093335 A1 | 4/2018 | Hart |
| 2019/0016006 A1 | 1/2019 | Gass |
| 2020/0072413 A1 | 3/2020 | Stoppenbrink et al. |
| 2022/0331922 A1 | 10/2022 | Stevens et al. |

* cited by examiner

SAFETY SYSTEM FOR MITER SAW AND METHOD OF USE THEREOF

CROSS-REFERENCE TO RELATED APPLICATION AND CLAIM TO PRIORITY

This Application is a Division of U.S. patent application Ser. No. 17/724,004 filed Apr. 19, 2022, which claims the benefit of U.S. Provisional Patent Application No. 63/176,474 filed Apr. 19, 2021, which is hereby incorporated herein by reference in their entirety and to which priority is claimed.

BACKGROUND OF THE INVENTION

1. Field of the Invention

The present invention is related to safety systems for power tools in general and, more particularly, to an aftermarket safety system for a power miter saw that reduces or eliminates potentially harmful contact of a hand of a saw operator with a circular saw blade of the miter saw, and a method of operating the power miter saw with the miter saw safety system.

2. Description of the Related Art

Conventional miter saws generally include a base member having a slot formed therethrough for receiving a circular saw blade and a pivotal support arm coupled to the base member and moveable between a raised position and a lowered position. A circular saw blade is mounted to a distal end of the support arm. When the support arm is lowered and the saw blade is being rotated by the electric motor coupled to the saw blade, the circular saw blade engages a workpiece, thereby cutting the workpiece. Additionally, the miter saw may include a mechanism for rotating the support arm around a z-axis (upward) relative to the base member for performing angled cutting operations.

A saw operator uses a miter saw by (1) placing a workpiece on the base member beneath the upraised saw blade and then (2) bringing the rotating saw blade down via the pivotal support arm to cut the workpiece. Miter saws present a risk of injury to saw operators because the rapidly rotating saw blade is often exposed when in use and will cut whatever it comes into contact with. Furthermore, saw operators often use their hands to position and support workpieces beneath the saw blade, which increases the risk of injury to the saw operator's hands.

Various safety systems have been developed to minimize the risk of injury during operation of miter saws. Typically, miter saw safety systems include guard mechanisms and operator detection systems. A guard mechanism usually provides a guard that physically prevents the saw operator from making physical contact with the active portions of the tool, such as the saw blade. However, some miter saws limit or preclude the use of a guard that could effectively prevent the saw operator from making contact with the active portion of the tool. Operator detector systems usually have some sensor to determine user contact with the saw blade, and a rapid acting system that rapidly stops the saw blade from rotating. The operator detecting systems sometimes necessitate expensive repairs due to their saw blade stopping systems.

Miter saws are frequently bought by users at various retailers. The basic saw may not come with guards or like safety systems. The absence of safety systems increases the risk of injury.

Therefore, the need exists for a safety system, including an aftermarket safety system, for a miter saw that ensures that the operator's hands are located away from the circular saw blade during operation of the miter saw, thus minimizing accidental contact with the rotating saw blade.

BRIEF SUMMARY OF THE INVENTION

According to a first aspect of the present invention, there is provided a safety system for a power miter saw. The safety system comprises a support member and at least one multidirectional manipulator including a workpiece holder member moveably mounted to the support member and adapted to secure a workpiece in place. A control box is electrically connected to the at least one multidirectional manipulator and electrically connectable to a trigger switch of the power miter saw. The workpiece holder member of the at least one multidirectional manipulator including a presence indicator operatively connected to the control box and configured to detect the physical presence of a saw operator's hand on the at least one multidirectional manipulator when the saw operator's hand engages the presence indicator. The control box is operatively connectable to a trigger switch of the power miter saw, so that an electric motor of the power miter saw is activated only when both the presence indicator of the safety system and the trigger switch of the power miter saw are engaged by both hands of an operator of the power miter saw.

Yet another aspect of the invention is a power miter saw in combination with a miter saw safety system. The power miter saw comprises a base adapted to hold a workpiece to be cut, a turntable mounted to the base, a swing arm pivotally mounted to the turntable to allow the swing arm to pivot toward and away from the base and the turntable, and a drive assembly mounted to a distal end of the swing arm. The drive assembly includes an electric motor drivingly coupled to a circular saw blade and a trigger switch for activating the electric motor of the power miter saw. The safety system comprises a support member and at least one multidirectional manipulator, including a workpiece holder member moveably mounted to the support member for moving relative to the base of the power miter saw. A control box is electrically connected to the at least one multidirectional manipulator, to the trigger switch of the drive assembly, and to the electric motor of the power miter saw. At least one multidirectional manipulator is operatively associated with the safety system and includes a presence indicator configured to indicate the physical presence of an operator's hand on the at least one multidirectional manipulator. The control box is operatively connected to the trigger switch of the power miter saw and to the presence indicator of the at least one multidirectional manipulator, so that the electric motor of the power miter saw is activated only when both the presence indicator of the safety system and the trigger switch of the power miter saw are engaged by hands of an operator of the power saw.

Yet another aspect of the invention is method of operating a power miter saw operably connected with a miter saw safety system. The miter saw safety system comprises a support member, and a left-side multidirectional manipulator and a right-side multidirectional manipulator spaced from each other in a transverse direction. Each of the left-side and right-side multidirectional manipulators include a workpiece holder member moveably mounted to the support member for moving relative to the base of the power miter saw. A control box is electrically connected to the left-side and right-side multidirectional manipulators and to a trigger switch of the power miter saw. Each of the left-side and right-side multidirectional manipulators include a presence indicator configured to indicate the physical presence of an operator's hand on the at least one multidirectional manipulator. The control box is operatively connected to the trigger switch of the power miter saw and to the presence indicator of each of the left-side and right-side multidirectional manipulators, so that the electric motor of the power miter saw is activated only when both the presence indicator of the safety system and the trigger switch of the power miter saw are engaged by hands of an operator of the power miter saw. The method includes the steps of positioning the workpiece on support surfaces of the miter saw. Selecting one of left-side and right-side manipulators. Moving the workpiece holder member of the selected one of the left-side and right-side manipulators to engage the workpiece. Engage the presence indicator on the selected one of left-side and right-side manipulators by one hand of a saw operator. Pressing the trigger switch of the miter saw for rotating a circular saw blade by another hand of the saw operator, while keeping the presence indicator engaged by one hand of the saw operator.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS

Figure 1:
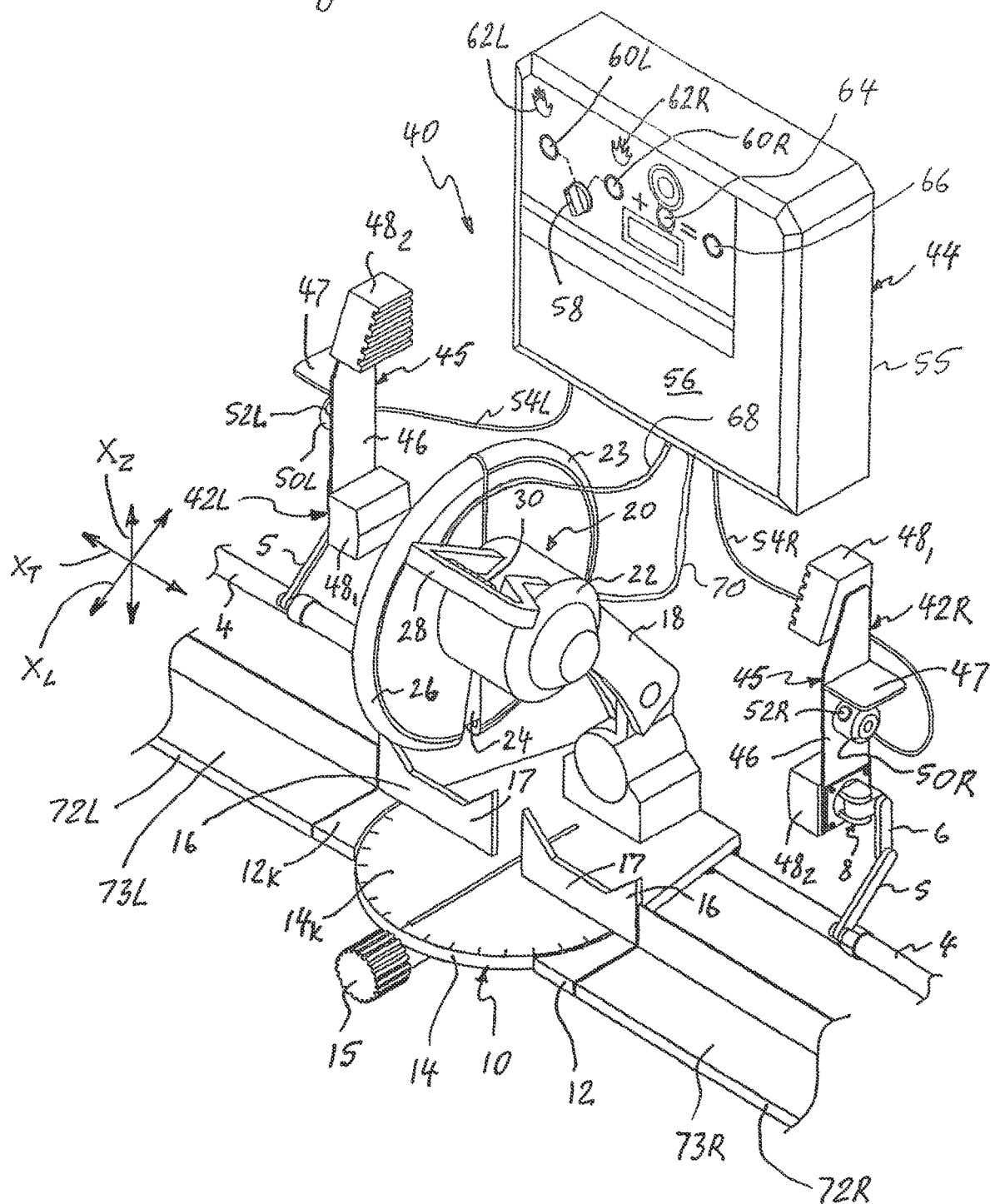
FIG. 1 is a perspective view of a conventional miter saw and a safety system according to an exemplary embodiment of the present invention.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "vertically," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 2:
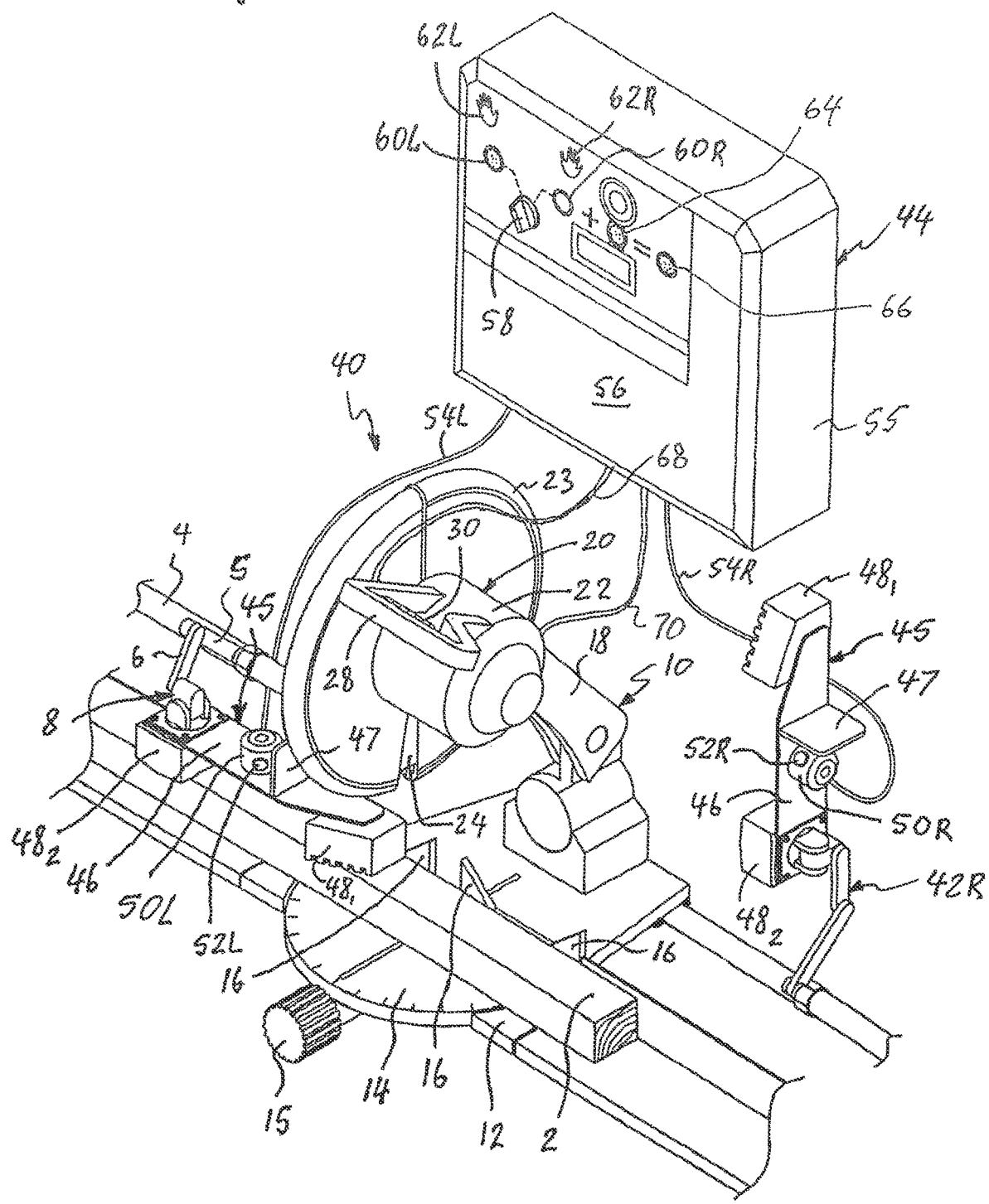
FIG. 2 is a perspective view of the conventional miter saw and the safety system according to the exemplary embodiment of the present invention with one of multidirectional manipulators engaging a workpiece.

FIGS. 1 and 2 depict a conventional power miter saw 10 provided with an aftermarket or add-on miter saw safety system (or safety kit) 40 according to an exemplary embodiment of the present invention for improving safety for a miter saw operator.

Typically, the conventional power miter saw 10 includes a power circular saw that can be positioned at a variety of angles and lowered onto a workpiece, such as a wooden board, positioned against a backstop known as a fence. Specifically, the power miter saw 10 comprises a base or stand 12 adapted to hold a workpiece 2 (shown in FIG. 2) to be cut, a turntable 14 mounted to the base 12, two vertical, horizontally spaced fences 16 against which the workpiece 2 is positioned, and a swing arm (or pivotal support arm) 18 pivotally coupled to the turntable 14 to allow the swing arm 18 to pivot toward and away from the base 12 and the turntable 14. The turntable 14 is rotatable relative to the base 12 in order to provide adjustment for miter cutting. The base 12 has a support (or top) surface 12$k$ coplanar with a cutting (or top) surface 14$k$ of the turntable 14. The support surfaces 12$k$ and 14$k$ are configured to support the workpiece 2 to be cut (as best shown in FIG. 2). Moreover, the turntable 14 is provided with a turntable positioning handle (or miter lock handle) 15 for miter adjustment. The vertical fences 16 are secured to the base 12 and are spaced apart so that the rotating saw blade 24 may pass therebetween when cutting the workpiece 2.

The miter saw 10 further comprises a drive assembly 20 mounted to a distal end of the swing arm 18. Thus, the drive assembly 20 on the swing arm 18 is moveable between a raised position and a lowered (cutting) position. The drive assembly 20 includes an electric motor 22 drivingly coupled to a circular saw blade 24, which is shielded by a safety guard 26, and a pull-down handle 28 serving as a grip used for pivoting downwardly and upwardly the drive assembly 20 for cutting operation and for controlling articulation of the circular saw blade 24 to engage the workpiece 2 (shown in FIG. 2). The electric motor 22 of the miter saw 10 is activated by a trigger (or trigger switch) 30 located on the pull-down handle 28 of the drive assembly 20. Attached to the swing arm 18 is a circular saw blade casing 23 at least partially enclosing the circular saw blade 24 therein. Conventionally, the safety guard 26 is movable relative to the circular saw blade casing 23.

Rotation of the turntable 14 changes the angle of the circular saw blade 24 relative to the vertical fences 16 but maintains the perpendicularity of the circular saw blade 24 with the base 12 and the turntable 14. A locking mechanism can be activated in order to lock the turntable 14 to the base 12. The vertical fences 16 have coplanar work surfaces 17 provided for engaging and positioning the workpiece 2 relative to the circular saw blade 24. The coplanar work surfaces 17 of the fences 16 extend in a transverse direction $X_T$. In operation, the workpiece 2 is placed on the base 12 beneath the raised circular saw blade 24, and then the circular saw blade 24 is brought down by the saw operator via the swing arm 18 and the pull-down handle 28 of the drive assembly 20 into a cutting zone to cut the workpiece 2. It should be understood that the miter saw 10 may be any type of miter saw, including but not limited to a simple miter saw, compound miter saw, sliding compound miter saw, etc. The conventional miter saw 10 may include various additional elements and controls.

The safety system 40 according to the present invention comprises two spaced apart multidirectional manipulators, left-side and right-side, 42L and 42R, respectively, and a control box 44 that monitors electrical circuits of the safety system 40 and is electrically connected to each of the left-side and right-side manipulators 42L and 42R. The left-side and right-side manipulators 42L and 42R are spaced from each other in the transverse direction $X_T$. Specifically, the left-side and right-side manipulators 42L and 42R are positioned on opposite sides of the circular saw blade 24 and the conventional pull-down handle 28 of the miter saw 10, and are spaced from the pull-down handle 28. The left-side and right-side manipulators 42L and 42R are structurally and geometrically identical but are oriented opposite to each other, as best shown in FIG. 1.

Each of the multidirectional manipulators 42L and 42R includes a workpiece holder member 45, and first and second articulated links 5 and 6 moveably connecting the workpiece holder member 45 to a support member 4 for movement relative to the base 12 of the power miter saw 10 along and/or around the transverse direction $X_T$, and longitudinal and vertical directions $X_L$ and $X_Z$, respectively, both perpendicular to the transverse direction $X_T$. According to the exemplary embodiment, the workpiece holder member 45 includes an elongated holder plate 46, and first and second holding blocks $48_1$ and $48_2$, respectively, secured to opposite distal ends of the elongated holder plate 46. Holding blocks $48_1$ and $48_2$ may be made from a flexible material, such as rubber, polyurethane, and like polymers. Moreover, the left-side manipulator 42L further includes a left handle 50L secured to the elongated holder plate 46 of the left-side manipulator 42L, while the right-side manipulator 42R further includes a right handle 50L secured to the elongated holder plate 46 of the right-side manipulator 42R.

Figure 3:
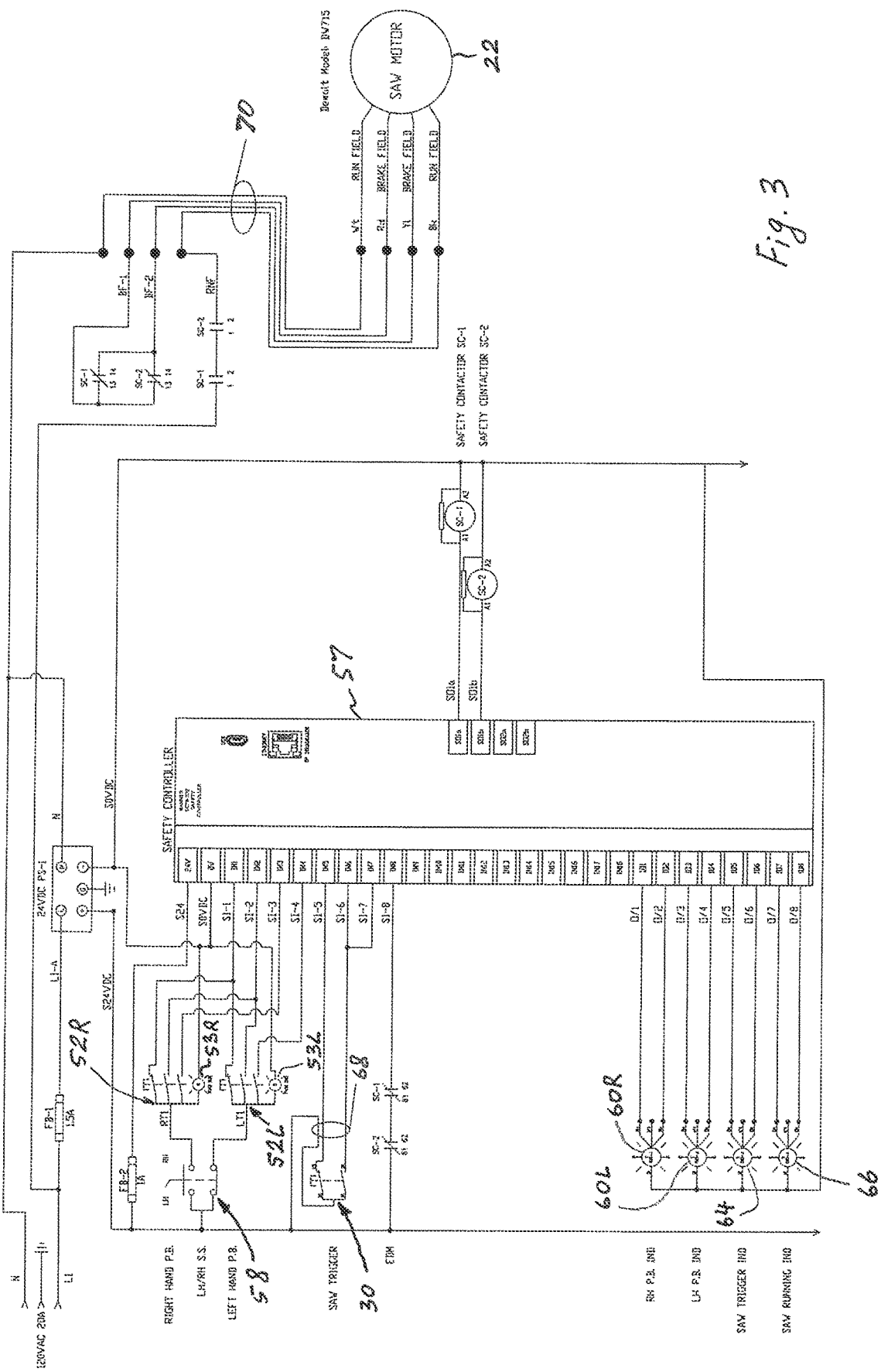
FIG. 3 is an electric circuit diagram of the miter saw safety system according to the exemplary embodiment of the present invention.

The left handle 50L is provided with a left presence indicator 52L, while the right handle 50R is provided with a right presence indicator 52R, as shown in FIGS. 1-3. The presence indicators 52L and 52R are each operatively connected to the control box 44 and configured to indicate the physical presence of the operator's hand when the left or right presence indicators 52L or 52R are engaged by the operator's hand. Preferably, the left and right presence detectors 52L and 52R are structurally identical. In view of the structural similarities of the left and right switches 52L and 52R, and in the interest of simplicity, the following discussion will use a reference numeral without a letter to designate an entire group of substantially identical structures. For example, the reference numeral 52 will be used occasionally when generically referring to the left and right switches 52L and 52R rather than reciting all two reference numerals.

According to the exemplary embodiment, each of the left and right presence indicators 52L and 52R is electrically connected to the control box 44, as best shown in FIG. 3. Each of the left or right indicator switches 52L or 52R is configured to detect (or indicate) the physical presence of the saw operator's hand when engaged by the saw operator's hand. The left and right indicator switches 52L and 52R may be any of a variety of electrical switches (or sensors) that detect the presence of the operator's hand. Preferably, each of the indicator switches 52L and 52R is a mechanical biased switch, such as a spring biased, push-button switch (or switch button) 52L or 52R shown in FIGS. 1 and 2. Each of the indicator switches 52L and 52R is activated when a finger of the operator's hand depresses the switch button 52L or 52R to indicate physical presence of the operator's hand.

Each of the left or right push-button switches 52L or 52R is configured to detect (or indicate) the physical presence of the operator's hand by pressing the left or right push-button switches 52L or 52R, so as to cause a lamp 53L or 53R (best shown in FIG. 3) mounted in the left or right push-button switch 52L or 52R to be illuminated. Alternatively, instead of the push-button switch, the presence indicators 52 may be in the form of electromagnetic sensors or electrical capacitance sensors configured to detect the presence of the operator's hand.

The push-button switches 52L and 52R of the multidirectional manipulators 42L and 42R are selectively electrically connected to the control box 44 through associated electrical wires when pressed, as best shown in FIG. 3. Each of the multidirectional manipulators 42L and 42R further includes a hand shield 47 disposed between the left handle 50L or the right handle 50R and the circular saw blade 24.

Moreover, each of the multidirectional manipulators 42L and 42R is supported on the support member 4, such as on support shaft 4 according to the exemplary embodiment, through first and second articulated links 5 and 6. The first articulated link 5 is pivotally connected to the support shaft 4. The second articulated link 6 is at the opposite distal end of support shaft 4. A distal end of the second articulated link 6 is pivotally connected to the workpiece holder member 45 via an articulated coupling 8. Alternatively, the multidirectional manipulators 42L and 42R may be configured to be mountable to the miter saw 10 using hold down holes conventionally provided in base 12. Each of the multidirectional manipulators 42L and 42R with the workpiece holder member 45 operates in the $X_T$, $X_L$ and $X_Z$ directions and functions as a workpiece hold down while the circular saw blade 24 is making a cut.

According to the exemplary embodiment, the support shafts 4 and the left-side and right-side manipulators 42L and 42R are fixedly connected to the miter saw 10, such as to the base 12 of the miter saw 10, as best shown in FIGS. 1 and 2, for example by welding or by a saw adaptor bracket.

The control box 44 monitors device circuits and includes a casing 55 having a control panel 56, and a safety controller 57 disposed within the casing 55. Mounted on the control panel 56 is a rotary selector switch 58 having two active positions: a left-hand position and a right-hand position. Also on control panel 56 are left-hand and right-hand indication lamps 60L and 60R, each activated when the selector switch 58 is in the corresponding left-hand or right-hand position. The left-hand and right-hand indication lamps 60L and 60R may have identical or different colors. The selector switch 58 selectively electrically connects the trigger switch 30 to one of the push-button switches 52L and 52R of the left-side and right-side manipulators 42L and 42R. Moreover, the left-hand and right-hand indication lamps 60L and 60R are marked on the control panel 56 with images of the left and right hand 62L and 62R, respectively. When the selector switch 58 is turned to the left-hand position toward the image of the left-hand 62L, the left push-button switch 52L is electrically connected with the trigger switch 30 through the selector switch 58 and the electrical wires 54L, and the left-hand indication lamp 60L is illuminated. As a consequence, the right push-button switch 52R is electrically disconnected from the trigger switch 30 and is not illuminated. Similarly, when the selector switch 58 is turned to the right-hand position toward the image of the right-hand lamp 62R, the right push-button switch 52R is electrically connected with the trigger switch 30 through the selector switch 58 and the electrical wires 54R, and the right-hand indication lamp 60R is illuminated. Consequently, the left push-button switch 52L is electrically disconnected from the trigger switch 30 and the lamp 60L is not illuminated. Thus, the electric motor 22 of the power miter saw 10 is activated only when both the presence indicator 52L or 52R of the safety system 40 and the trigger switch 30 of the power miter saw 10 are engaged by both hands of the saw operator, as best shown in FIG. 3.

The selector switch 58 allows the saw operator to select which of the left-side and right-side manipulator switch buttons 52L or 52R will be used to assure safe operation. If the manipulator switch buttons 52L and 52R or the saw trigger 30 fail, the miter saw 10 will not start. The control panel 56 has a trigger indication lamp 64 illuminated when the trigger switch 30 is pressed, and a motor indication lamp 66 illuminated when the electric motor 22 of the miter saw 10 is running. Moreover, the electric motor 22 of the miter saw 10 and the trigger switch 30 are electrically connected to the control box 44 through a safety interface cord (or wire) 68 to the trigger switch 30 of the electric motor 22, and a power cord 70 to the electric motor 22 of the power miter saw 10. Thus, the trigger switch 30 is monitored by the control box 44 for the safety system 40 to fully function.

The electronic equipment of the safety system 40 preferably uses Category 3 safety circuits and has potential to reduce safety risks of the saw operator.

The exemplary operation sequence of the miter saw 10 with the safety system 40 is as follows.

First, electrical power is supplied to the miter saw 10 and the safety system 40, while the drive assembly 20 is in the raised position and the saw blade is not rotating.

Next, the saw operator manipulates the selector switch 58 on the control panel 56 to indicate whether the left-side or right-side manipulator 42L or 42R will be used. The saw operator has to choose which hand (left or right) to use for manipulating the pull-down handle 28 and the trigger switch 30 of the drive assembly 20. If the saw operator selects to use the left-side manipulator handle 50L with the left switch button 54L, then the operator turns the selector switch 58 to the left-hand position and thus toward the image of the left hand 62L. When oriented in this position, the left-hand indication lamp 60L is illuminated, indicating that the left-side manipulator 42L is to be used. Similarly, if the saw operator elects to use the right-side manipulator handle 50R with the right switch button 52R, then the operator turns the selector switch 58 to the right-hand position and thus toward the image of the right hand 62R. When oriented in this position, the right-hand indication lamp 60R is illuminated for indicating that the right-side manipulator 42R is to be used.

Next, according to the exemplary embodiment, left-side and right-side support tables 72L and 72R are provided, each having support surfaces 73L and 73R, respectively, and the saw operator positions the workpiece 2 on the support surfaces 12k and 14k of the miter saw 10 along the fences 16 of the base 12, and on the support surfaces 73L, 73R of the left-side and right-side support tables 72L and 72R, as best shown in FIG. 2. As illustrated n FIG. 2, the workpiece 2 is also supported by the support surfaces 73L and 73R of the support tables 72L and 72R, respectively. At least one the selected left-side and right-side manipulator 42L or 42R is used to secure the workpiece 2 in place. Specifically, one the selected left-side and right-side manipulator 42L or 42R is moved toward the workpiece 2 so that the holding blocks $48_1$ and $48_2$ of one the selected left-side and right-side manipulator 42L or 42R firmly presses the workpiece 2 to the support surfaces 12k, 14k and 73L or 73R.

Next, the operator's hand location is verified before allowing the circular saw blade 24 to rotate. Specifically, the operator must have one hand pressing the switch button 52L or 52R on either the left-side or right-side manipulator 42L or 42R, while the other hand is pressing the trigger switch 30 on the miter saw 10 for the circular saw blade 24 to start. In order to start the electric motor 22 of the miter saw 10, one of the switch buttons 52L and 52R and the trigger switch 30 must be pressed within a set time period or the miter saw 10 will not start. Trigger switch 30 and switch button 52L or 52R, as appropriate, must both be activated, such as within 500 msec of one another in order for saw motor 22 to start. These inputs are monitored by the diagnostics in control box 44 and determine whether the appropriate starting conditions for saw motor 22 are in place. Because they must be pressed within a defined period of each other, the operator is prevented from tying down or otherwise setting the switches in a preset condition allowing the motor 22 to operate when operation of motor 22 may not be appropriate. Accordingly, the operator has to grip the left or right handle 50L or 50R and press and hold the corresponding switch button 52L or 52R on the manipulator 42L or 42R, then grip the pull-down handle 28 and press the trigger switch 30 within a specified amount of time for the circular saw blade 24 to start to rotate. Without pressing and holding one of the switch buttons 52L and 52R on the manipulator 42L or 42R, the electric motor 22 cannot be activated even if the trigger switch 30 is pressed. Accordingly, if the operator's hands or even a single hand is removed, a dynamic brake quickly stops the circular saw blade 24. When the operator presses the trigger switch 30, the trigger indication lamp 64 is illuminated, and when the electric motor 22 is activated (i.e., starts running), the motor indication lamp 66 is illuminated.

Having one hand of the miter saw operator actively pressing one of the switch buttons 52L and 52R located a safe distance away from the rotating circular saw blade 24 and the other hand pressing the trigger switch 30 on the pull-down handle 28 makes accidental contact of the operator's hands with the rotating circular saw blade 24 far less likely. The multidirectional manipulator 42L or 42R is used to hold in place the workpiece 2 that is being cut. The manipulator 42L or 42R allows the operator to make minor adjustments to the placement of the workpiece 2 before the cut.

The saw operator presses the pull-down handle 28 downwards to pivot the drive assembly 20 toward the workpiece 2 and start cutting the workpiece 2. After completing the cut, the drive assembly 20 with the circular saw blade 24 is returned to the raised position, and the switch button 52L or 52R and the trigger switch 30 may then be released in order to break the circuit.

Therefore, the safety system of the present invention requires the saw operator to have one hand pressing the switch button on either the left-side or right-side manipulator while the other hand is pressing the trigger switch on the miter saw in order to allow the miter saw to start. Having both hands actively pressing the switch button and the trigger switch located a safe distance away from the rotating circular saw blade makes accidental contact with the rotating saw blade far less likely.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A power miter saw in combination with a miter saw safety system, the power miter saw comprising a base adapted to hold a workpiece to be cut, a turntable mounted to the base, a swing arm pivotally mounted to the turntable to allow the swing arm to pivot toward and away from the base and the turntable, and a drive assembly mounted to a distal end of the swing arm, the drive assembly including an electric motor drivingly coupled to a circular saw blade and a trigger switch for activating the electric motor of the power miter saw, the safety system comprising:
   a support member;
   at least one multidirectional manipulator including a workpiece holder member moveably mounted to the support member for moving relative to the base of the power miter saw; and
   a control box electrically connected to the at least one multidirectional manipulator and to the trigger switch of the drive assembly and to the electric motor of the power miter saw;
   the workpiece holder member of the at least one multidirectional manipulator including a presence indicator mounted on the workpiece holder member and configured to indicate the physical presence of an operator's hand on the at least one multidirectional manipulator;
   the control box operatively connected to the trigger switch of the power miter saw and to the presence indicator of the at least one multidirectional manipulator so that the electric motor of the power miter saw is activated only when both the presence indicator of the safety system and the trigger switch of the power miter saw are engaged by hands of an operator of the power miter saw.

2. The power miter saw in combination with a miter saw safety system as defined in claim 1, wherein the workpiece holder member includes a holder plate, at least one holding block secured to the holder plate for engaging the workpiece, and a handle secured to the holder plate, and wherein the handle is provided with the presence indicator.

3. The power miter saw in combination with a miter saw safety system as defined in claim 1, wherein the at least one multidirectional manipulator further includes first and second articulated links moveably connecting the workpiece holder member to the support member for multidirectional movement relative to the support member.

4. The power miter saw in combination with a miter saw safety system as defined in claim 3, wherein the at least one multidirectional manipulator further includes an articulated coupling pivotally connecting the workpiece holder member to the second articulated link.

5. The power miter saw in combination with a miter saw safety system as defined in claim 1, wherein the miter saw safety system comprises a left-side manipulator and a right-side manipulator each including a workpiece holder member spaced from each other in a transverse direction, wherein the workpiece holder member of each of the left-side and right-side manipulators is moveably mounted to the support member for moving relative to the base of the power miter saw, wherein the workpiece holder member of each of the left-side and right-side manipulators includes the presence indicator configured to indicate the physical presence of the operator's hand on one of the left-side and right-side manipulators, and wherein the control box is operatively connected to the presence indicator of each of the left-side and right-side manipulators.

6. The power miter saw in combination with a miter saw safety system as defined in claim 5, wherein the presence indicator is mounted to the workpiece holder member of each of the left-side and right-side manipulators.

7. The power miter saw in combination with a miter saw safety system as defined in claim 6, wherein the workpiece holder member of each of the left-side and right-side manipulators includes a holder plate, at least one holding block secured to the holder plate for engaging the workpiece, and a handle secured to the holder plate, and wherein the handle is provided with the presence indicator.

8. The power miter saw in combination with a miter saw safety system as defined in claim 5, wherein the control box comprises a selector switch having a left-hand position and a right-hand position, wherein the selector switch selectively electrically connects the trigger switch to the presence indicator of one of the left-side and right-side manipulators.

9. The power miter saw in combination with a miter saw safety system as defined in claim 8, wherein the control box further comprises left-hand and right-hand indication lamps, each activated when the selector switch is in the corresponding left-hand or right-hand position.

10. The power miter saw in combination with a miter saw safety system as defined in claim 9, wherein the left-hand and right-hand indication lamps are marked on the control panel with images of a left hand and a right hand.

11. A method of operating a power miter saw operably connected with a miter saw safety system, the miter saw safety system comprising:
   a support member;
   a left-side multidirectional manipulator and a right-side multidirectional manipulator spaced from each other in a transverse direction, each of the left-side and right-side multidirectional manipulators including a workpiece holder member moveably mounted to the support member for moving relative to the base of the power miter saw; and
   a control box electrically connected to the left-side and right-side multidirectional manipulators and to a trigger switch of the power miter saw;
   each of the left-side and right-side multidirectional manipulators including a presence indicator mounted on the workpiece holder member and configured to indicate the physical presence of an operator's hand on the at least one multidirectional manipulator;
   the control box operatively connected to the trigger switch of the power miter saw and to the presence indicator of each of the left-side and right-side multidirectional manipulators so that the electric motor of the power miter saw is activated only when both the presence indicator of the safety system and the trigger switch of the power miter saw are engaged by hands of an operator of the power miter saw;

the method comprising the steps of:

positioning the workpiece on a support surface of the miter saw;

selecting one of left-side and right-side manipulators;

moving the workpiece holder member of the selected one of the left-side and right-side manipulators to engage and in place the workpiece;

engaging the presence indicator on the selected one of left-side and right-side manipulators by one hand of a saw operator;

pressing the trigger switch of the miter saw for rotating a circular saw blade by another hand of the saw operator while keeping the presence indicator engaged by one hand of the saw operator.

12. The method as defined in claim 11, wherein the control box comprises a selector switch having a left-hand position and a right-hand position, wherein the selector switch selectively electrically connects the trigger switch of the power meter saw to the presence indicator of one of the left-side and right-side manipulators, and wherein the step of selecting one of the left-side and right-side manipulators includes setting the selector switch in one of the left-hand position and the right-hand position to indicate whether the left-side or right-side manipulator is to be used.

* * * * *